United States Patent [19]

Verdiell et al.

[11] Patent Number: 5,121,400
[45] Date of Patent: Jun. 9, 1992

[54] DEVICE FOR COHERENT ADDITION OF LASER BEAMS

[75] Inventors: Jean-Marc Verdiell, Beltsville, Md.; Jean-Pierre Huignard; Henri Rajbenbach, both of Paris, France

[73] Assignee: Thomson-CSF, Puteaux, France

[21] Appl. No.: 620,032

[22] Filed: Nov. 30, 1990

[30] Foreign Application Priority Data

Dec. 1, 1989 [FR] France .................. 89 15878

[51] Int. Cl.⁵ .................................................. H01S 3/13
[52] U.S. Cl. ....................................... 372/32; 372/21; 372/68; 372/71; 372/97; 372/108
[58] Field of Search ............... 372/21, 97, 71, 68, 372/108, 32; 350/354, 364, 169

[56] References Cited

U.S. PATENT DOCUMENTS

| | | | |
|---|---|---|---|
| 4,648,092 | 3/1987 | Eubank et al. | 372/21 |
| 4,757,268 | 7/1988 | Abrams et al. | 372/21 |
| 4,761,059 | 8/1988 | Yeh et al. | 350/354 |
| 4,833,683 | 5/1989 | Ury et al. | 572/41 |
| 4,907,238 | 3/1990 | Chun et al. | 372/21 |

OTHER PUBLICATIONS

Optics Letter, vol. 14, No. 1, Jan. 1989, pp. 81-83, Optical Society of America, New York, US: W. R. Christian et al.; "Energy transfer between injection-locked single-mode diode lasers by two-beam coupling in BaTiO3".

Applied Physics Letters, vol. 50, No. 24, Jun. 15, 1987, pp. 1713-1715, New York, US; L. Goldberg et al.: "Injection locking and single-mode fiber coupling of a 40-element laser diode array".

*Primary Examiner*—Georgia Y. Epps
*Attorney, Agent, or Firm*—Oblon, Spivak, McClelland, Maier & Neustadt

[57] ABSTRACT

Device for coherent addition of laser beams including several optical amplifiers in parallel pumped by a beam coming from a master laser. The beams emitted by these amplifiers are transmitted to a non-linear material and play the role of pump beams. The non-linear material also receives a signal beam derived from the master laser. The various beams of the amplifiers are therefore added in the non-linear material along the direction of the signal beam.

9 Claims, 2 Drawing Sheets

DEVICE FOR COHERENT ADDITION OF LASER BEAMS

BACKGROUND OF THE INVENTION

The invention concerns a device for coherent addition of laser beams and, more particularly, a device for the phase adjustment and coherent addition of beams from laser networks.

The combination of a set of emitters in a laser network is an advantageous method of increasing the power output of a laser source. Very powerful sources can be obtained by combining low power components, which are technically easier to make. Moreover, the use of multiple sources of reduced power facilitates the removal of heat inevitably produced. On the other hand, the principal properties of a laser beam (coherence, directivity) are lost in a network unless the phase relation between the different lasers is stable.

SUMMARY OF THE INVENTION

The present invention describes a device which assures the coherence between the different components of the network and thus the addition of the amplitudes of the individual signals. The network will then emit a powerful beam, coherent and directive (limited by diffraction), the same as that emitted by a powerful single source.

The invention therefore concerns a device for coherent addition of laser beams, characterized by the fact that it includes:

A master laser emitting a master light beam of given wavelength;

A device which receives the master beam and splits it in several directions;

Several optical amplifiers or lasers (a laser is in fact an optical amplifier placed in a resonant optical cavity) each located on one of the paths of the split laser and receiving part of the master light beam and each reemitting a slave beam;

A device of non-linear material receiving, first, a probe beam of wavelength more or less equal to that of the master beam and, secondly, the slave beams, the probe beam interfering with the slave beams which then play a role of pump beams in the non-linear material to record a hologram. The slave beams diffract on this hologram to produce a reading beam.

In particular, in this device the optical amplifiers are laser networks, each network receiving a master beam at an angle greater than zero with respect to the normal of the input face of the laser network, and emitting a slave beam from this same face in a symmetrical direction to that of the master beam relative to the normal of the input face.

BRIEF DESCRIPTION OF THE DRAWINGS

The different purposes and characteristics of the invention will be more clearly understood in the description below, given as an example, and by examining the figures in the appendix which show.

DETAILED DESCRIPTION OF THE INVENTION

Figure 1:
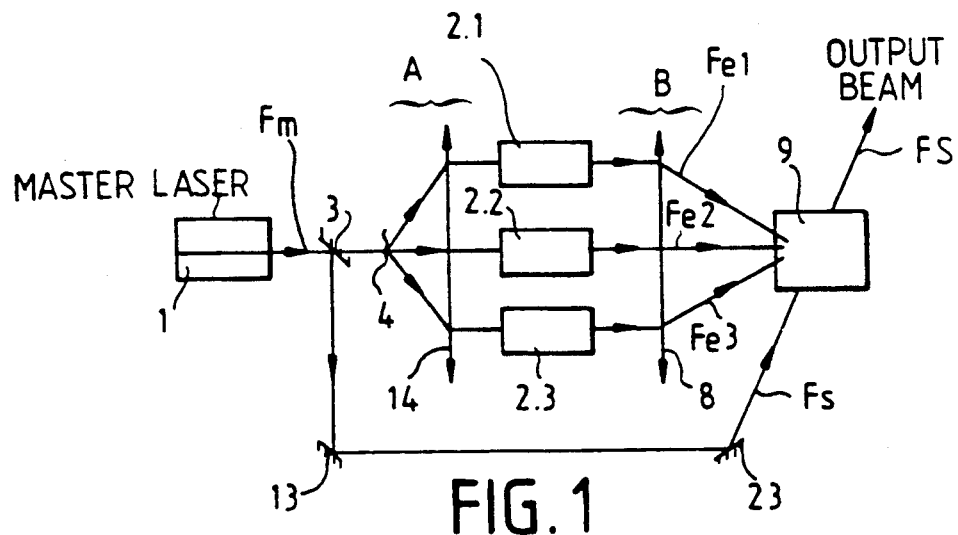
FIG. 1: an example of a simplified version of the device.

The device shown in FIG. 1 includes a "pilot" laser or master laser 1 of low power but excellent coherence (monomode laser). Part of the master beam Fm emitted by laser 1 is deviated by a part 3 (semi-transparent film) to form a probe beam Fs. The other part of the master beam Fm is divided and directed using optical devices 4 and 14, composed for example of a diffraction device 4 and lenses 14, to different parts of the network. These parts 2.1 to 2.3 can be optical amplifiers whose output beams are coherent with that of the pilot laser 1. These parts can also be true small lasers, which will then be used in "injection locking" mode and operate as slave lasers. In this mode the slave lasers are controlled by the master laser 1 and their slave beams Fe1 to Fe3 are perfectly coherent with that of the master.

The beams emitted by parts 2.1 to 2.3 are directed by a optical device (such as a lens) onto a non-linear medium 9. The slave beams Fe1 to Fe3 constitute the "pump waves" for a two wave interaction in the non-linear medium 9. The probe wave Fs from the master laser 1 is also directed to the non-linear medium 9 by mirrors 13 and 23. This non-linear medium can be for example a photorefractive crystal of $BaTiO_3$, BSO, GaAs or InP.

A hologram is then recorded in the non-linear medium 9 between the pump waves Fe1 to Fe3 and the probe beam Fs. The pump beams which diffract on this hologram act as a "reading" beam. In this way the energy of the pump beams Fe1 to Fe3 is diffracted in the direction FS of the probe beam, with the same phase as that imposed by the probe beam. There is therefore transfer of energy between the pump and the probe. Since the divergence of the probe beam is limited by the diffraction, a coherent addition of the beams emitted by the network has been achieved; at the same time the phase adjustment allows an output beam to be obtained which is as perfect as the probe. It is important to note that the relative position of the parts of the network is not critical and that it is not necessary to adjust the optical paths to within a fraction of a wavelength in order to achieve this addition of beams. We can also remark that the direction of the output beam FS is given by the direction of the probe Fs. The deviation of the low power probe beam allows the direction of the high power beam to be controlled.

Figure 2:
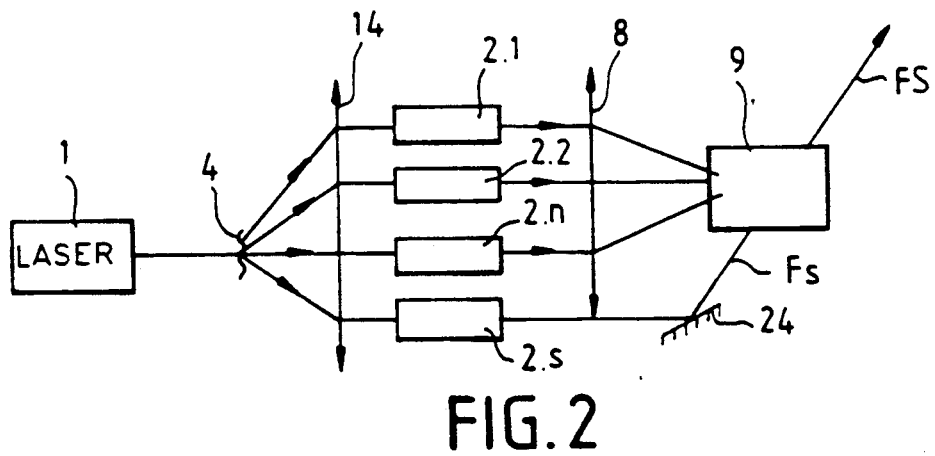
FIGS. 2 and 3: variants of the device shown in FIG. 1.

FIG. 2 represents a variant of the invention shown in FIG. 1. In this case the beam splitter used to extract the probe beam is not included. The device shown in FIG. 2 has in parallel with the optical amplifiers 2.1 to 2.3 an optical amplifier 2.s which provides a probe beam Fs. This beam is transmitted by a mirror 24 to the non-linear medium 9.

The operation of the device in FIG. 2 is then the same as described previously for FIG. 1.

This variant device allows a more intense probe beam Fs than that obtained directly from the master beam Fm.

Figure 3:
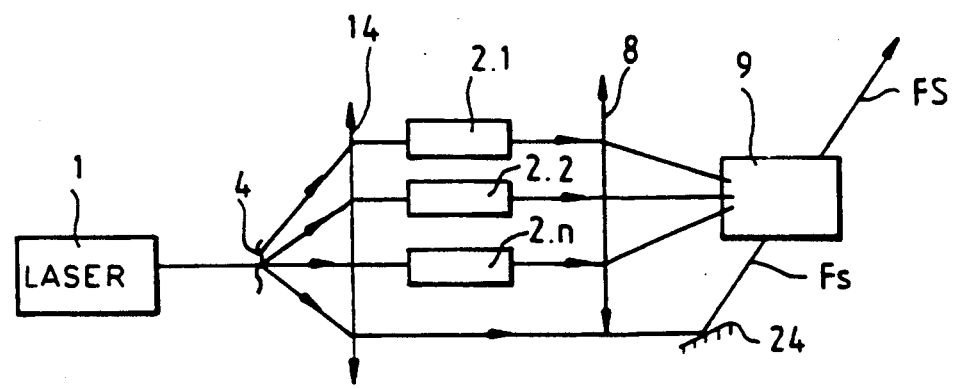

We can also make the invention, as shown in FIG. 3, by adopting the architecture of the device shown in FIG. 2 but without the optical amplifier 2.s. The probe beam Fs is then not amplified.

Figure 4:
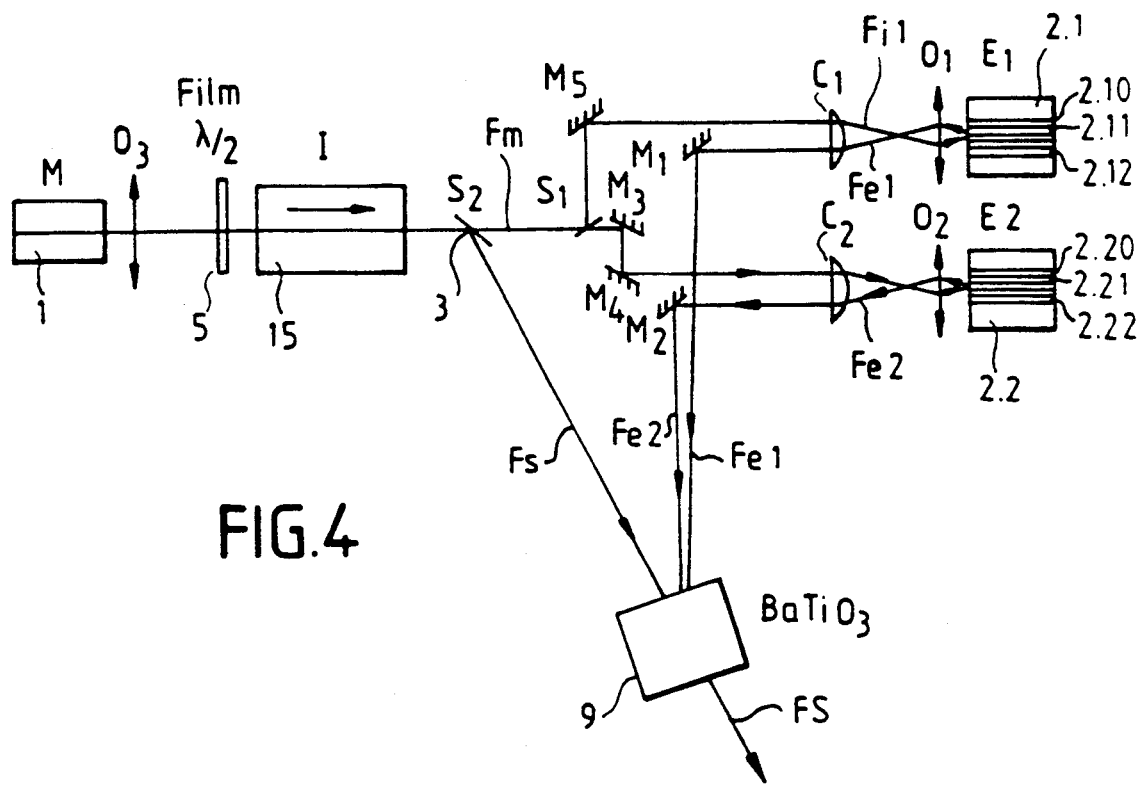
FIG. 4: another more detailed example of the device.

FIG. 4 shows another form of the device.

The master laser 1 is constituted by a laser diode guided by the index, transverse and longitudinal monomode, of the emission power P of about 30 mV. The master beam Fm, shaped by the lens 03 passes through a half-wave film 5 then a Faraday effect optical insulator 15, so as to prevent undesirable return of light to the master laser 1. The beam Fm is then separated in three by half-reflecting mirrors S1 and S2.

The mirror S2 allows the probe beam to be obtained.

The mirror S1 allows the two so-called "injection beams" to be obtained which serve as master beams for the slave beams 2.1 and 2.2.

These two beams are shaped by cylindrical lenses C1 and C2 and the objectives 01 and 02 so as to provide two beams of prolonged flat section which will be injected into the slave lasers 2.1 and 2.2.

The slave lasers 2.1 and 2.2 are networks including a certain number of lasers 2.10 to 2.1n and 2.20 to 2.2n. (10 for example) guided by the gain, of relatively high power (200 mW for example). Each slave laser therefore emits a slave beam which is in fact the combination of several elementary slave beams.

The injection beam Fi1 is at a small angle (about 4°) to the normal of the input face of the network, so as to optimize the injection conditions and separate angularly the injection beam Fi from a slave beam Fe1.

In FIG. 4 the injection beams, such as Fi1, and the slave beam Fe1 have been shown in a simplified way.

Figure 5:
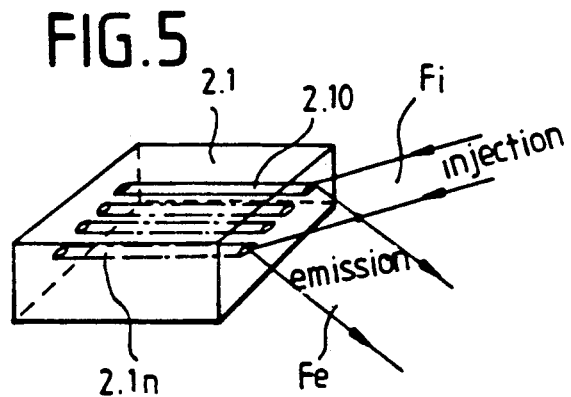
FIG. 5: a perspective view of a laser network.

FIG. 5 shows a view of a laser network 2.1. The network of lasers 2.1 therefore receives the injection Fi1 which makes a non-zero angle with the normal of the input face of the laser 2.1. This injection laser Fi1 allows all the lasers 2.10 to 2.1n to be excited. The network of lasers responds by emitting a slave laser Fe1 which also makes an angle to the normal of the input face of the network.

More precisely, the slave beam Fe1 lies in a plane which is practically parallel to that containing the injection beam Fi1, with respect to a plane normal to the input face.

The injection beams are transmitted to the laser networks by the mirrors M3, M4 and M5.

The slave beams Fe1 and Fe2 are deviated by mirrors M1 and M2 towards a non-linear crystal 9, and form pump waves for a two wave interaction in the crystal 9. The probe beam Fs comes from the master after reflection on the separator S2. The non-linear crystal is for example barium-titanium. A small angle (about 1°) is chosen between the two pump waves Fe1 and Fe2 and a larger angle (about 20°) between the probe wave Fs and the pump waves Fe1 and Fe2, so as to maximize the efficiency of the interaction. The crystal 9 is oriented in such a way as to favorize the energy transfer of the pump waves Fe1 and Fe2 to the probe wave Fs. The probe wave amplified after its passage in the crystal forms the output beam Fs of the system, whose divergence is limited by diffraction.

The invention can be used to obtain powerful, coherent, directional sources from two dimensional networks of semiconductor lasers. Any other laser medium can also be used: solid (such as YAG:Nd bars), liquid or gaseous.

It is clear that the preceding description is non-restrictive and that other variants can be envisaged within the framework of the invention. The numerical examples and the nature of the materials indicated are given only to illustrate the description.

What is claimed is:

1. A device for coherent addition of laser beams, comprising:
   a master laser emitting a master light beam of a determined wavelength;
   a splitting device for receiving the master light beam and dividing it in a plurality of directions;
   a plurality of optical amplifiers or lasers each situated on one of the plurality of directions for receiving part of the divided master light beam and for transmitting a respective slave light beam which is coherent with that of the master beam; and
   a device made of a non-linear material which receives a probe beam of wavelength essentially the same as that of the master beam and each of the respective slave light beams, wherein the probe beam interferes with the slave light beams which act as pump beams in the non-linear material to record a hologram, and wherein the slave light beams are diffracted in a direction of the probe beam to produce a coherent addition of said pump beams.

2. The device according to claim 1, further comprising a separator device located on the path of the master light beam which extracts a part of the master light beam to produce the probe beam.

3. The device according to claim 1, in which an amplifier or laser situated on one of the several directions receives part of the master light beam and retransmits it to the device of non-linear material to form the probe beam.

4. The device according to claim 1, further comprising a focusing device located between the optical amplifiers and the device of non-linear material which focuses the slave beams onto the device of non-linear material.

5. The device according to claim 1, wherein the device of non-linear material is made from $BaTiO_3$.

6. The device according to claim 1, wherein the optical amplifiers are networks of lasers, each network receiving the master light beam from a direction making a non-zero angle with a normal of an input face of the laser network, and emitting the slave beam from the input face in a direction approximately symmetrical to the direction of the master beam relative to the normal of the input face.

7. The device according to claim 6, further comprising an optical transformation device located between the beam splitting device and the laser network, and associated with each laser network, for transforming each master light beam into a master beam of section elongated in such a way that the largest dimension of the beam section allows excitation of all the laser networks.

8. The optical device according to claim 1, further comprising an isolator located between the master laser and the beam splitting device.

9. The optical device according to claim 1, wherein the device of non-linear material is made from BSO, GaAs or InP.

* * * * *